Aug. 16, 1932.          V. J. EVANS          1,872,433
CONTROL SYSTEM FOR GAS BURNING APPLIANCES
Filed Oct. 8, 1928

Inventor:
Vincent J. Evans
by
Edmund J. Te Pas
His Attorney

Patented Aug. 16, 1932

1,872,433

UNITED STATES PATENT OFFICE

VINCENT J. EVANS, OF LAKEWOOD, OHIO, ASSIGNOR TO THE PATROL VALVE COMPANY, OF CLEVELAND, OHIO, A CORPORATION OF OHIO

CONTROL SYSTEM FOR GAS BURNING APPLIANCES

Application filed October 8, 1928. Serial No. 311,074.

This invention relates to thermostatic valves and in particular room thermostats arranged to control appliances in accordance with the temperature conditions surrounding the thermostat.

It is the object of this invention to provide a generally simplified thermostatic valve which is quickly responsive to small changes in temperature and which may be readily adjusted to operate at various predetermined temperatures throughout a wide temperature range.

Stated in general terms my improved thermostat consists of a case arranged to permit air circulation therethrough and within the case I have located a curved thermostatic bar, one end of which is secured to a valve body and the other end of which is free and arranged to effect the operation of a valve member located within the valve body and bodily adjustable with respect to the thermostat.

With the above mentioned and other objects in view, the invention consists in the novel construction, arrangement and combination of parts, hereinafter described, illustrated in some of its embodiments in the accompanying drawing and particularly pointed out in the appended claims.

Figure 1:
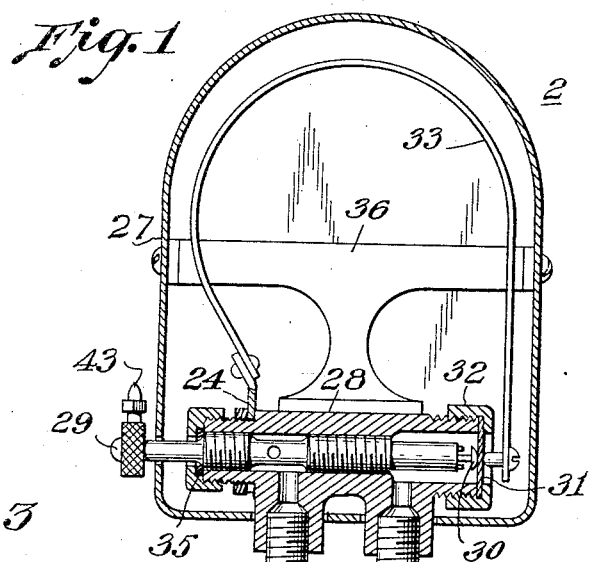
Figure 2:
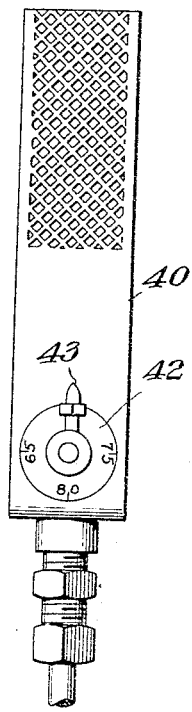
Figure 3:
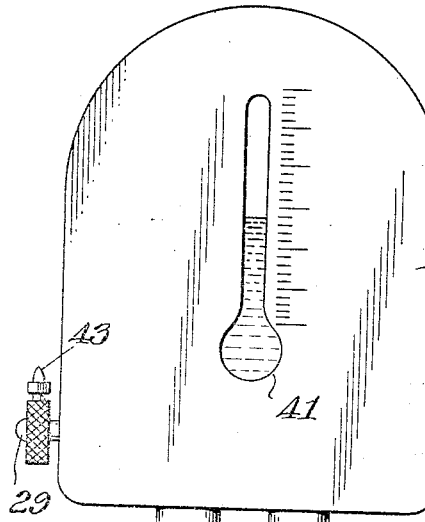
Figure 4:
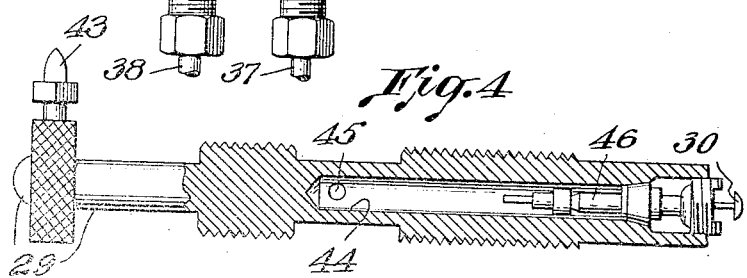

Referring to the drawing showing one embodiment of my invention, Figure 1 is a side elevational view, partly in section showing my improved room thermostat with its cover removed. Figure 2 is an elevational view of that side of the room thermostat upon which the temperature setting member is located. Figure 3 is a side elevational view of the completely assembled thermostat. Figure 4 is a sectional view of the valve stem and valve used in the room thermostat.

My improved room thermostat 2 is provided with a valve structure 46 similar to that used in connection with automobile tires, one form of which is illustrated in United States Letters Patent No. 1,426,350 issued to Adelbert E. Bronson, August 22, 1922. The valve parts 46 are carried in an adjustable valve body 29. This valve body is provided with a centrally bored out portion 44 and has outlet openings 45 at its inner end. The stem of the valve 46 is provided with a rounded head 30 to prevent its piercing the flexible sealing diaphragm 31. The valve body 29 is adjustably carried in a valve casing 28 which is internally threaded for its reception. A packing gland and nut 35 are carried on one end of the valve casing 28 to prevent the escape of gas from around the valve body 29. The opposite end of the valve casing 28 is provided with an apertured cap 32 that is threadably received on the valve casing 28 and that secures a flexible diaphragm 31 over the open end of the casing.

A circularly bent, bimetallic, temperature responsive strip 33 is secured at one end 24 to the valve casing 28. The free end of the thermostatic element 33 is adapted under predetermined temperature conditions to make contact with the diaphragm 31 at a point opposite to the rounded end of the valve stem 30 and in this manner open and close the valve 46 in accordance with the temperature conditions around the thermostat 2.

The valve body 29 is provided with a knurled knob and a pointer 43 so that it may be set to open the valve at any desired temperature as indicated by the disk 42. The valve casing 28 is carried by a supporting member 36 which is in turn secured to the back cover member 27 of the room thermostat. The front cover 40 is provided with openings in its top to permit circulation of air through the thermostat so that any changes in temperature will be readily communicated to the temperature sensitive element 33. The thermostat cover 40 is provided with a thermometer 41 to indicate the room temperature.

When the temperature of the room, in which the thermostat 2 is located has reached the desired point, the thermostatic strip 33 moves out of engagement with the stem 30 of the valve 46 allowing this valve to close and cutting off the flow of fluid between the conduits 37 and 38. Where the device is used to control a heating appliance, such operation of the valve would stop the further heating of the room until its temperature dropped to the point where the resultant movement of the thermostat 33 reopened the valve 46 whereupon the heating appliance would be placed in operation again.

I have mentioned the control of heating appliances as a possible use for my improved valve. Obviously refrigerators and other appliances which are susceptible of control by a thermostatic valve or by a pneumatic motor or a heat motor operatively associated with such a valve are other uses to which my improved valve commends itself.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

I claim:

1. A temperature responsive valve comprising, a protecting enclosure adapted to permit air circulation therethrough, a temperature responsive element rigidly secured within said enclosure, and an adjustable valve comprising an operatively associated valve head and valve seat adapted to be opened and closed by said element at predetermined temperatures, and means to bodily shift said valve with respect to said temperature responsive element to cause it to be operated at different temperatures.

2. A valve comprising, a valve casing with inlet and outlet openings formed therein, a valve body adjustably carried in said valve casing, a spring closed valve carried in said valve body having a valve stem projecting therefrom and a flexible diaphragm adapted to contact with said valve stem and to provide a closure for one end of said valve casing.

3. A temperature responsive valve comprising, a protecting enclosure, a circularly formed temperature responsive element in said enclosure, and a movable valve comprising a valve head and associated valve seat operatively associated with said element and bodily adjustable with respect thereto.

4. A thermostatic valve comprising a valve casing, a thermostatic element secured to one end of said casing and having its free end overlying the opposite end of said casing, and a unitary valve comprising an associated valve head and valve seat in said casing adapted to be moved bodily toward and away from the free end of said thermostatic element and operatively associated therewith.

In testimony whereof I affix my signature.

VINCENT J. EVANS.